United States Patent
Tate et al.

(10) Patent No.: US 11,776,042 B2
(45) Date of Patent: Oct. 3, 2023

(54) DETERMINING GENERIC ITEMS FOR ORDERS ON AN ONLINE CONCIERGE SYSTEM

(71) Applicant: Maplebear, Inc., San Francisco, CA (US)

(72) Inventors: Tyler Russell Tate, Vallejo, CA (US); Jason Scott, San Francisco, CA (US); Logan William Murdock, San Francisco, CA (US); Tejaswi Tenneti, Fremont, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/929,797

(22) Filed: Sep. 6, 2022

(65) Prior Publication Data

US 2022/0414746 A1    Dec. 29, 2022

Related U.S. Application Data

(63) Continuation of application No. 16/984,443, filed on Aug. 4, 2020, now Pat. No. 11,468,493.

(51) Int. Cl.
*G06Q 30/0601* (2023.01)
*G06F 16/9538* (2019.01)
*G06Q 30/0283* (2023.01)
*G06Q 10/087* (2023.01)

(52) U.S. Cl.
CPC ..... *G06Q 30/0631* (2013.01); *G06F 16/9538* (2019.01); *G06Q 10/087* (2013.01); *G06Q 30/0283* (2013.01); *G06Q 30/0603* (2013.01); *G06Q 30/0617* (2013.01);
(Continued)

(58) Field of Classification Search
CPC ............ G06Q 30/0631; G06Q 10/087; G06Q 30/0283; G06Q 30/0603; G06Q 30/0617; G06Q 30/0625; G06Q 30/0635; G06Q 30/0641; G06F 16/9538
See application file for complete search history.

(56) References Cited

U.S. PATENT DOCUMENTS

| 8,620,707 B1 | 12/2013 | Belyi et al. |
| 2002/0004789 A1 | 1/2002 | Huyler |
| 2017/0323250 A1 | 11/2017 | Lindbo et al. |

(Continued)

OTHER PUBLICATIONS

PCT International Search Report and Written Opinion, PCT Application No. PCT/US2021/041859, dated Oct. 28, 2021, 17 pages.

*Primary Examiner* — A. Hunter Wilder
(74) *Attorney, Agent, or Firm* — Fenwick & West LLP

(57) ABSTRACT

An online system provides options for selection by a user. The online system receives a query entered on a client device. The online system queries an item database to retrieve a set of items related to the query and assigns each item to a product category in a predefined taxonomy that maps items to product categories. The online system inputs each item into a prediction model trained to predict a probability that an item is available at a warehouse location. The online system determines that a first product category has low availability based on predicted probabilities for items in the first product category. Responsive to determining that a first product category has low availability, the online system generates a generic item for the first product category and sends a list of items including the generic item to the client device for display responsive to the query.

18 Claims, 7 Drawing Sheets

(52) U.S. Cl.
CPC ..... *G06Q 30/0625* (2013.01); *G06Q 30/0635* (2013.01); *G06Q 30/0641* (2013.01)

(56) References Cited

U.S. PATENT DOCUMENTS

2019/0213509 A1 7/2019 Burleson et al.
2019/0236740 A1 8/2019 Rao et al.

DETERMINING GENERIC ITEMS FOR ORDERS ON AN ONLINE CONCIERGE SYSTEM

CROSS REFERENCE TO RELATED APPLICATIONS

This application is a continuation of co-pending U.S. application Ser. No. 16/984,443, filed Aug. 4, 2020, which is incorporated by reference in its entirety.

BACKGROUND

This disclosure relates generally to determining generic items. More particularly, the disclosure relates to generating a generic item for a product category in an online concierge system.

In current online systems and mobile applications, a customer creates an order of items to be purchased from a retailer. To facilitate the customer's shopping experience, the online system or mobile application may present items in an online catalog of items available at a retailer to the customer, who may select items to add to the order. For example, the customer may search for "flour," and the online system or mobile application may present multiple brands, types, and sizes of flour for the customer to choose from for the order. However, sometimes items from the catalog may be in high demand, resulting in the items being hard to find or out of stock and unavailable to add to an order. For instance, a customer may want to purchase toilet paper, but if all types, brands, and sizes of toilet paper are out of stock at the retailer, the online system or mobile application may not allow the customer to add toilet paper to the order. Thus, the customer does not have a method for indicating that they would like to include toilet paper in the order. Therefore, a system for providing options for selection by a customer is necessary.

SUMMARY

To provide options for selection by a customer, an online concierge system determines a set of items matching a query received from a client device and matches the items to a product category from a taxonomy of products, which includes plurality of product categories describing items available for purchase on the online concierge system. The online concierge system uses a prediction model to predict, for each item, a probability that the item is available at a retailer. If the online concierge system determines that a product category has low availability (i.e., the items in the product category have low probabilities of availability), the online concierge system generates a generic item for the product category and sends, as a response to the query, a list of items for display on the client device where the list includes the generic item as one of the items in the list of items.

More particularly, in some embodiments, the online concierge system receives a query sent from a user device. The online concierge system queries an item database using the received query to retrieve a set of items matching the query. The online concierge system maps each item of the set of items to a product category from a plurality of product categories in a predefined taxonomy that maps items to product categories. The online concierge system inputs each item of the set of items into a prediction model. The prediction model is a machine learning model that is trained to predict a probability that an item is available at one or more third-party warehouse locations. The online concierge system determines that a first product category has a low availability based on the predicted probability that each of the items assigned to the first product category is available at one or more third-party warehouse locations. Responsive to determining that the first product category has low availability, the online concierge system generates a generic item for the first product category and sends, in response to the query, a list of items for display on the user device where the list includes the generic item as an item.

In some embodiments, the online concierge system presents a maximum price for the generic item to a picker fulfilling an order including the generic item. The online concierge system determines a popular size of items assigned to the first product category and retrieves prices for each item assigned to the first product category. The online concierge system selects an interior price range from within a price range of the retrieved prices. The low end of the interior price range is a first percentile of the price range (e.g., the $25^{th}$ percentile), and the high end of the interior price range is a second percentile of the price range (e.g., the $75^{th}$ percentile). The online concierge system receives an order from the user device including the generic item as one of the items in the order and presents, via a user interface of a second user device associated with a picker, the items in the order, including the generic item with a maximum price based on the price range.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
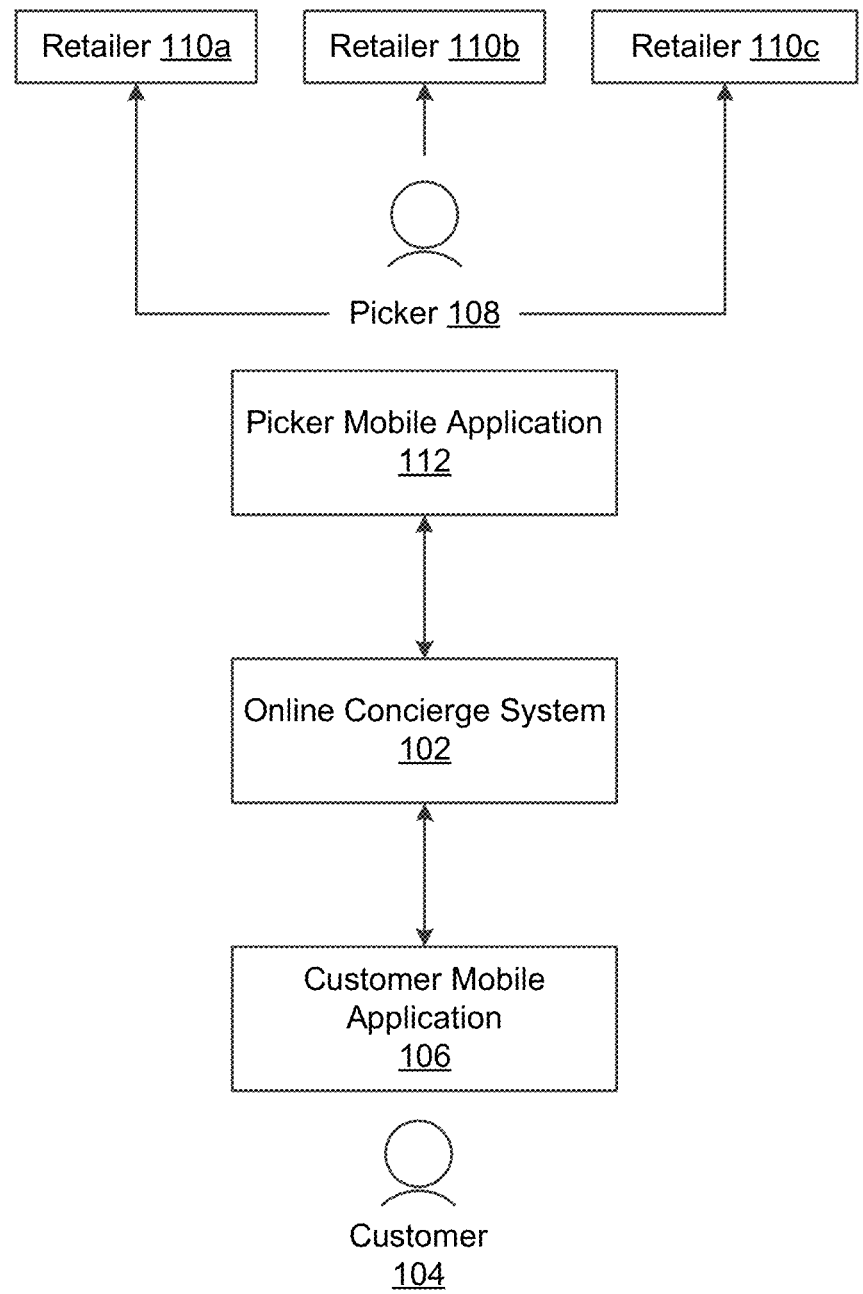
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
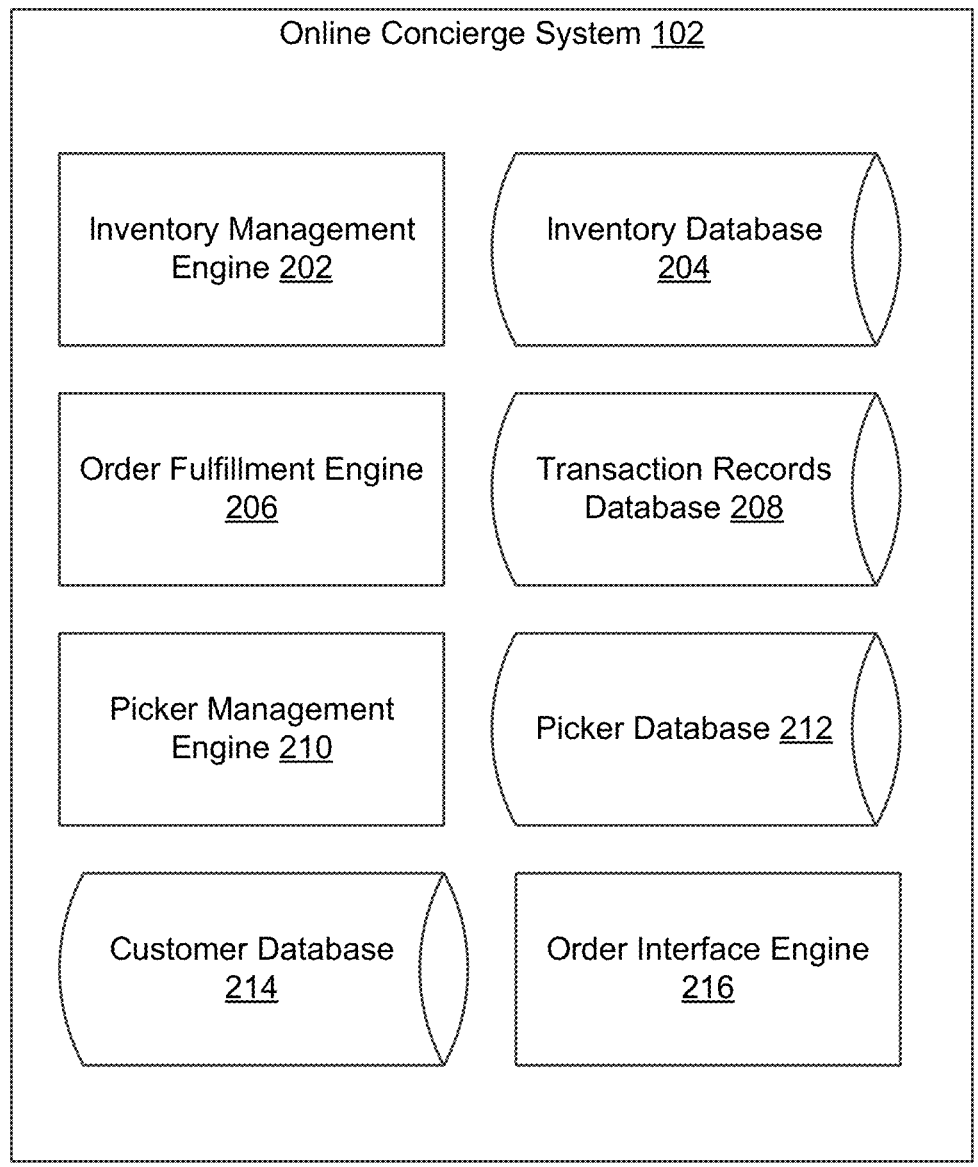
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The online concierge system 102 may use a communication engine 216 that transmits information between the customer mobile application 106 and the picker mobile application 112. The information may be sent in the form of messages, such as texts or emails, or notifications via application, among other forms of communication. The communication engine 216 may receive information from each application about the status of an order, the location of a customer 104 in transit, issues with items in an order, and the like. The communication engine 216 determines a message or notification to send to a customer 104 or picker 108 based on this information and transmits the notifications to the appropriate application. In one embodiment, the online concierge system 102 may receive messages composed via a user interface of the picker mobile application 112 and transmit the messages to the customer mobile application 106 (or vice versa) via the communication engine 216. For example, a picker 108 may compose, via a picker order interface, a message indicating that an item of an order is not available. The online concierge system 102 may receive the message from the picker mobile application 112 and transmit the message to the customer mobile application 106 associated with the order. The customer 104 may interact with a customer ordering interface to indicate a course of action for the item, such as to remove the item from the order. The online concierge system 102 receives this information and transmits it in the form of a message to the picker mobile application 112.

Figure 3A:
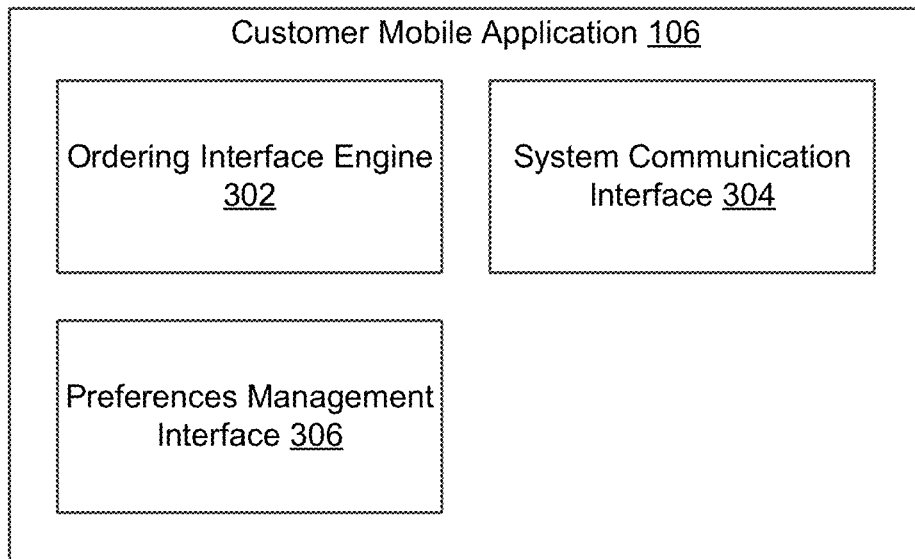
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
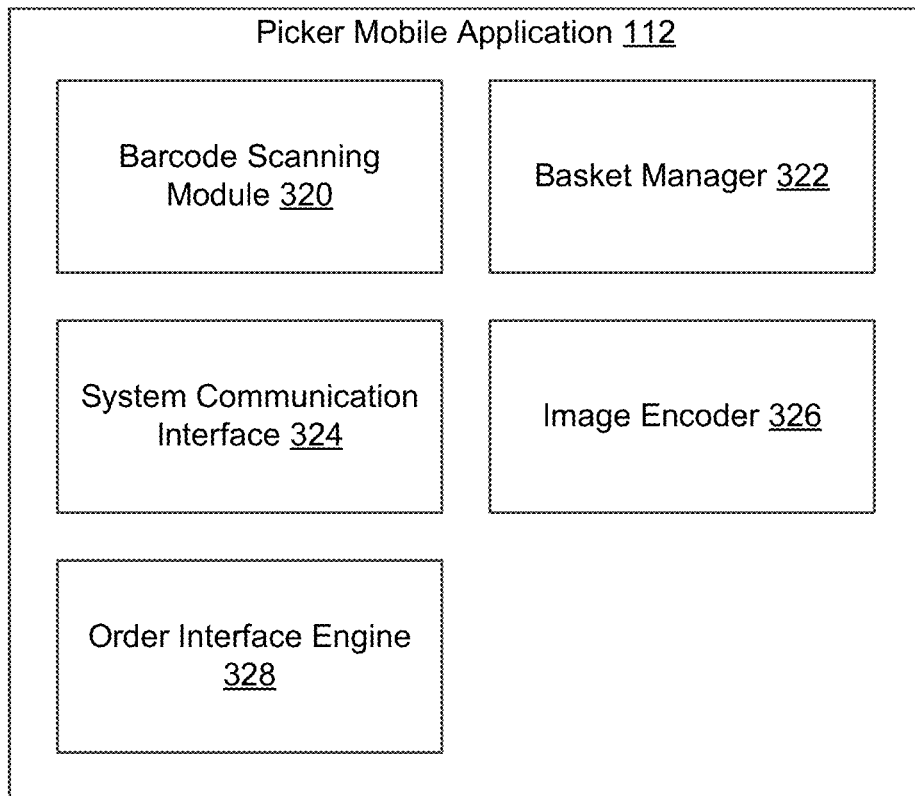
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to the order interface engine 328, which generates a picker order interface.

A picker order interface is an interactive interface through which pickers 108 may interact message with customers 104 and receive notifications regarding the status of orders they are assigned. Pickers 108 may view their orders through the picker order interface and indicate when there is an issue with an item in an order, such as the item being out of stock or of poor quality. A picker 108 may draft a message to a customer 104 associated with the order requesting clarification about what to do for the item given the issue. The picker order interface displays template messages for the picker 108 to choose from regarding the item and the picker 108 may edit the template message to include more information about the item or a question for the customer 104.

The picker 108 communicate back and forth with the customer 104 until the issue is resolved.

Figure 4:
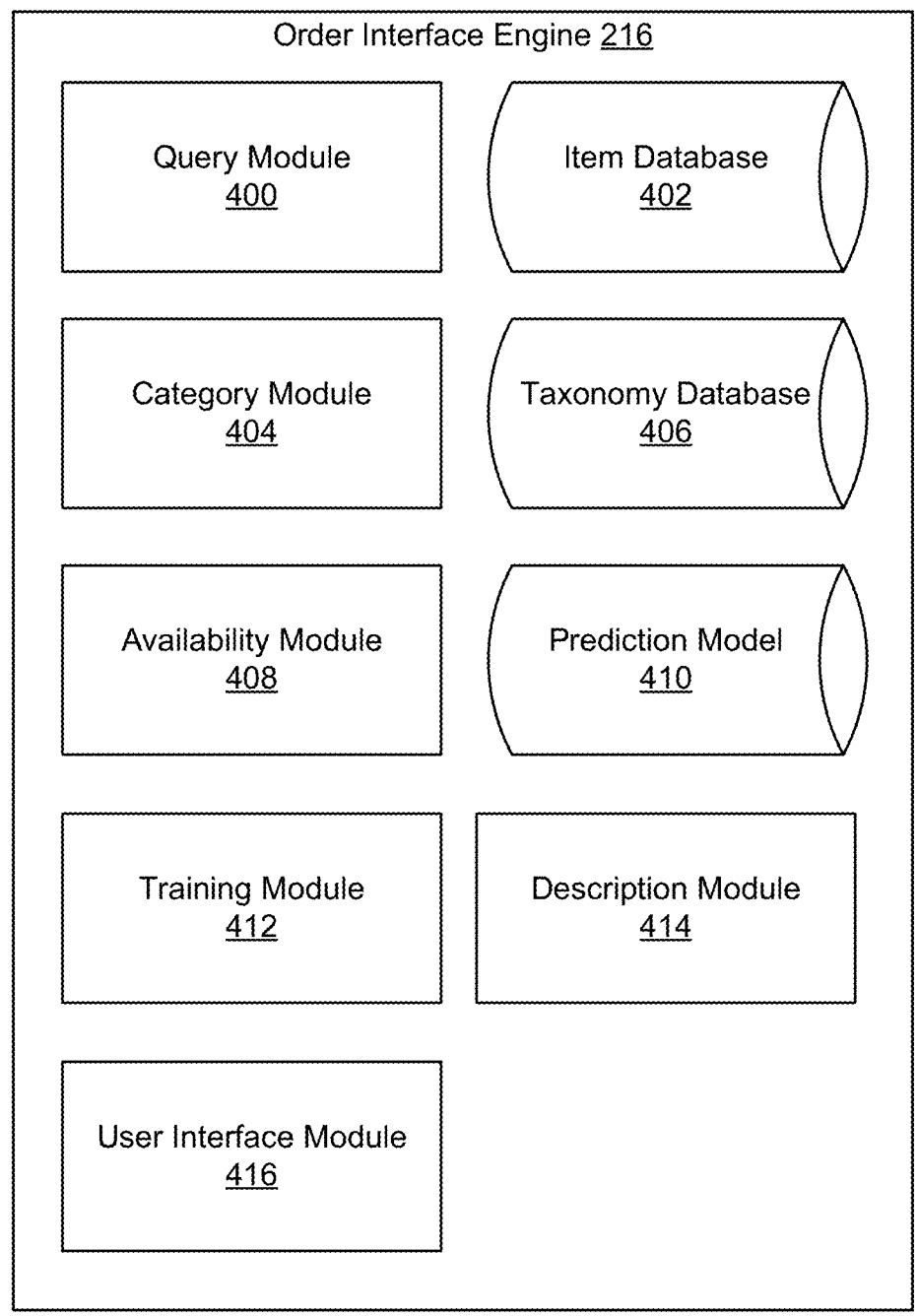
FIG. 4 is a block diagram of an order interface engine 216, according to one embodiment.

FIG. 4 is a block diagram of an order interface engine 216, according to one embodiment. The order interface engine 245 includes a query module 400, an item database 402, a category module 404, a taxonomy database 406, an availability module 408, a prediction model 410, a training module 412, a description module 414, and a user interface module 416. In some embodiments, the order interface engine 216 has more or different components than those shown in FIG. 4. In other embodiments, the components shown in FIG. 4 may be combined or removed.

The query module 400 determines a set of items based on a query. The query module 500 receives a query from the CMA 106 running on a customer's 104 client device. A query is a word or string of text entered by a customer 104 in the customer ordering interface to search the online concierge system 102 for an item. For example, a customer 104 may enter the query "butter" via the customer ordering interface when looking for butter on the online concierge system 102. Queries may also include text indicating brand, type, quantity, and other descriptive information about one or more items. In another example, the customer 104 may enter "yummy butter" or "organic butter" when querying the online concierge system 102. These queries indicate that the customer 104 is looking for a particular brand (e.g., "Yummy") or type (e.g. "organic") of butter.

The query module 400 queries the item database 402 using the received query. The item database 402 contains items stored at a plurality of warehouse locations. The item database 402 may be an index of items stored by warehouse location and/or items stored by matching queries previously received by the online concierge system 102. The item database 402 may further include information relate to each item, such as brands, types, and sizes of item (e.g., "milk" is associated with the brand "Moo Moo," the types "organic" and "lactose-free," and the size "1 gallon"). The item database may also include sale information for the items indicating price of each item by size and/or type and a number of orders each size and/or type of an item was in. In some embodiments, the query module 400 receives an item subsequently added to an online shopping cart for an order from the CMA 106 and pairs the query to the item in the item database 402.

The query module 400 retrieves a set of items matching the query for one or more warehouse locations designated by the customer 104 via the customer ordering interface. The query module 400 may perform a text search for items in the item database 402 that match text of the query or may match the query with a previous query stored in the item database 402 in relation to one or more items. In some embodiments, the query module 400 finds items for warehouse locations located within a geographic range from the customer's 104 address associated with his/her account. In other embodiments, the query module 400 finds items for a warehouse location entered by the customer 104 via the customer ordering interface before receiving the query. For instance, the query module 400 may retrieve, for the query "butter" and the warehouse location "Grocery 365: Mountain View location," the items "Yummy butter," "Moo Moo Organic butter," and "Dairy-free Veggie butter" from the item database 402. The query module 400 sends the set of items matching the query to the category module 404 and the user interface module 416. The query module may send the one or more warehouse locations to the availability module 408.

The category module 404 maps a set of items to categories in the taxonomy database 406. The taxonomy database 406 stores a predefined taxonomy that maps items to product categories. A product category describes items with shared characteristics. For example, the category module 404 may map the item "Moo Moo Organic butter" to the product category "butter." Further, the predefined taxonomy is a hierarchical structure of product categories. For instance, the product category "butter" may be a leaf category of the predefined taxonomy branching from the product categories "dairy products" and "spreads," which each branch from the product category "foods." A leaf category is the most specific product category of the hierarchical taxonomy and does not have other product categories branching from it. In another example, the leaf category "toilet paper" may branch from the product category "toiletries," which in turn branches from the product category "household goods."

The category module 404 receives a set of items from the query module 400 and maps each item from the set of items to one or more product categories in the taxonomy database 406. In some embodiments, the category module 404 only maps items to leaf categories from the taxonomy database 406. For example, the category module 404 may map the items "Italia frozen pizza bagels" and "Average Joe's mini bagels" to the product categories "frozen pizza" and "bagels," respectively. The category module 404 sends the set of items and the product categories with mapped items to the availability module 408.

The availability module 408 determines whether a product category has low availability. A product category has low availability if items mapped to that product category are likely unavailable at one or more warehouse locations. The availability module 408 receives a set of items and product categories the items in the set of items are mapped to. The availability module 408 also receives one or more warehouse locations designated by the customer 104 via the customer ordering interface either directly from the CMA 106 or from the query module 400. For each warehouse location, the availability module 408 inputs each item in the set of items to a prediction model 410. The prediction model 410 is a machine learning model trained to predict a probability that an item is available at a warehouse location. The prediction model 410 is trained by the training module 412 using deep learning, reinforcement learning, or any other suitable training method. The training module 412 trains the prediction model on data describing items included in previous orders, whether each item in each previous order was picked, a warehouse location associated with the previous orders, and a plurality of characteristics associated with each of the items. The prediction model 410 is described in application Ser. No. 15/885,492, filed on Jan. 31, 2018, which is incorporated in its entirety herein by reference.

The availability module 408 receives a probability of availability for each item at each of the one or more warehouse locations from the prediction model 410. For each assigned product category received from the category module 404, the availability module 408 determines a total predicted likelihood of availability for the product category based on the predicted likelihood for each item assigned to the product category. In some embodiments, the availability module 408 may determine a total predicted likelihood for each product category at each warehouse location, and in other embodiments, the availability module 408 may determine a total predicted likelihood for each product category accounting for all items mapped to the product category, regardless of warehouse location. The total predicted likelihood may be an average, a median, a maximum, or another combination of the predicted likelihoods of each item in a product category. If the total predicted likelihood is below a threshold value for a product category, the availability module 408 determines that the product category has a low availability. The availability module 408 sends product categories with low availability and the items mapped to those product categories to the description module 414.

The description module 414 generates generic items for product categories. A generic item describes a generic version of items in a product category. The description module receives one or more product categories with low availability from the availability module 408. For each product category with low availability, the description module 414 collects information describing each item mapped to the product category from the item database 402, such as brand, type, sizes, units, and other descriptive information. Further, the description module 414 may retrieve one or more images of the items from the item database 402 or an external system.

The description module 414 determines a price range for each product category with low availability. The price range indicates prices that items mapped to the product category typically sell for. For example, items in the product category "toilet paper" may sell for prices between $6 and $20, depending on the brand, type, and size of the item. For each product category with low availability, the description module 414 determines a popular size of items mapped to the product category from the item database 402. The popular size is the size of items in the category that has been in the most orders. For instance, items in the product category "ice cream" may have been ordered more in a gallon size than a pint size.

The description module 414 retrieves prices for each item mapped to the product category in the popular size, resulting in a price range of retrieved prices for the product category. For example, the prices of items sold in the gallon size of the product category "vanilla ice cream" may range from $5.00 for "365 Brand vanilla ice cream" to $16.00 for "Artisanal vanilla bean frozen gelato." The description module 414 selects an interior price range from within the price range. A low end of the interior price range is a lower percentile of the price range (e.g., 25th percentile) while a high end of the interior price is a higher percentile of the price range (e.g., 75th percentile). Returning to the example, the interior price range for the product category "vanilla ice cream" may be $7.50 to $11.75, which removes outlier prices from the price range for the product category such as the $16 for "Artisanal vanilla bean frozen gelato."

The description module 414 generates, for each product category with low availability, a generic item using the information from the item database and the interior price range. In one example, a generic item for the product category "all-purpose flour" may include a name "all-purpose flour," a textual description "your shopper will find the best available flour," an interior price range of $2 to $6, a popular size of 2 pounds, and an image of a bag of flour. The description module 414 sends the generic items for each product category with low availability to the user interface module 416.

The user interface module 416 generates customer ordering interfaces for display on a customer's 104 client device. The user interface module 416 receives one or more generic items from the description module 414 and a set of items from the query module 400. The user interface module 416 generates a customer ordering interface including the set of items and the generic item in response to a query from the customer 104. The user interface module 416 sends the customer ordering interface for display via the CMA 106 with the generic item depicted along with the items in the set of items. The user interface module 416 may receive indications from interactive elements in the customer ordering interface, which the customer 104 may interact with to add the generic item or another item to an order, receive more information about the generic item or an item, or enter a new query. The customer ordering interface is further described in relation to FIG. 5.

The user interface module 416 receives indications of whether a generic item was added to an order placed through the online concierge system 102. The user interface module 416 generates a picker order interface presented via the PMA 112 to a picker who picks items in the order from a warehouse location. The picker order interface may present the generic item with the same information as shown by the customer ordering interface and/or may present instructions to the picker to pick an item that matches the generic item and is available at the warehouse location associated with the order. The user interface module 416 may also include a maximum price for the generic item to the picker, which may be the maximum price in the price range or the interior price range for the product category associated with the generic item.

The picker may indicate, via the picker ordering interface, that they have picked an item matching the generic item such as by entering information about the item to the picker order interface or scanning a barcode of the item using the PMA 112. The user interface module 416 may update a total price of the order based on the price of the picked item and display to total price of the order upon delivery of the order to the customer, as indicated via the CMA 106, the PMA 112, or a mobile application associated with a delivery agent who delivered the order to the customer.

Though FIG. 4 is explained in the context of using an online concierge system, this is just one example environment in which the invention can be used. The order interface engine 216 may be used in other systems to generate generic items based on item availability, and other embodiments may use an online system, mobile application, or any other system in which a customer creates orders of items. In further embodiments, generic items are generated on a mobile device instead of an online system and may be displayed to an individual querying for items to add to an order in another fashion than described in the figures.

Figure 5A:
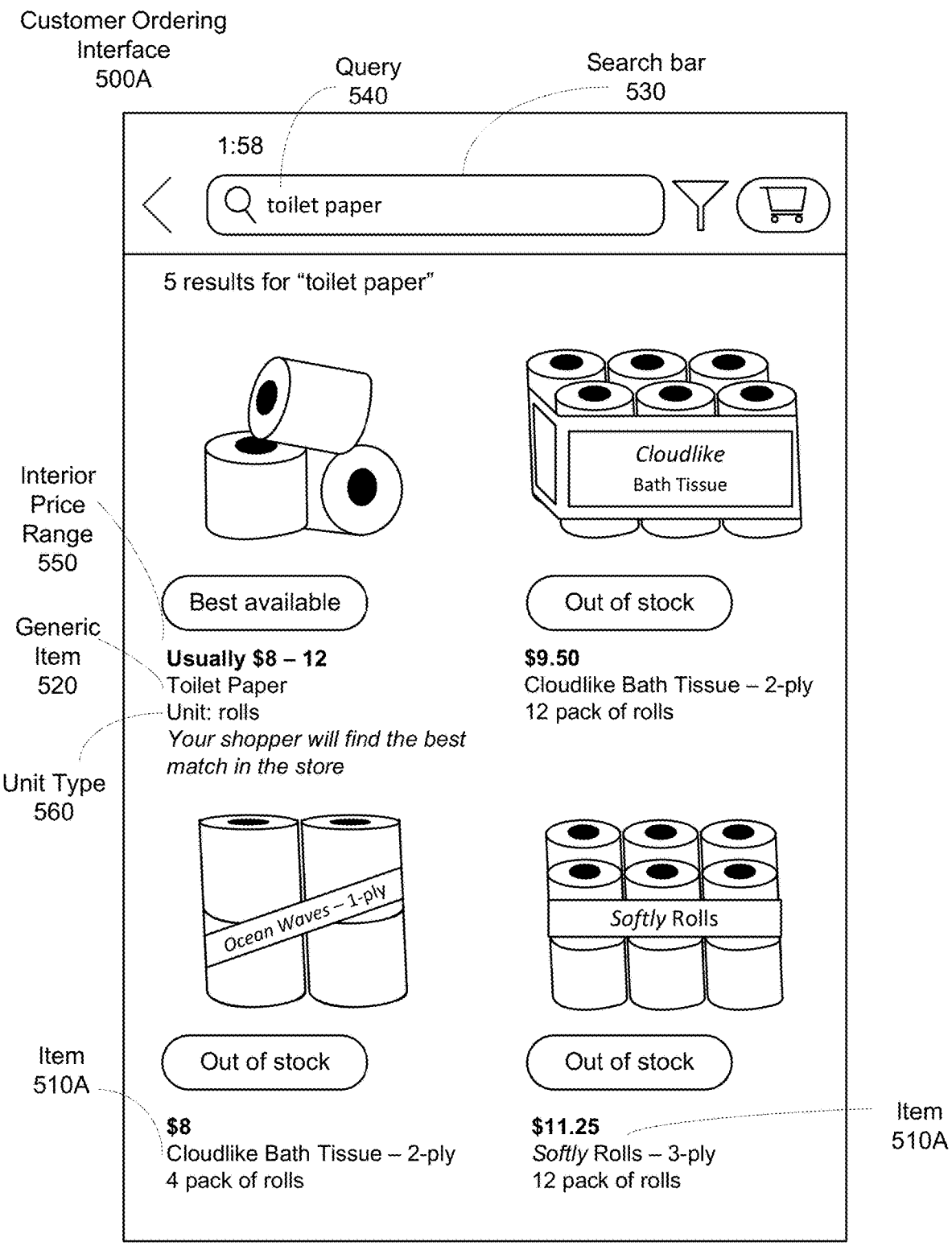
FIG. 5A is an example of a customer ordering interface depicting items, according to one embodiment.

FIG. 5A is an example of a customer ordering interface 500A depicting items 510, according to one embodiment. A customer 104 may interact with the customer ordering interface 500A to create an order of items to purchase from a warehouse location. The customer ordering interface 500A displays interactive elements that the user customer 104 interacts with to create the order. A search bar 530 receives queries 540, such as "toilet paper," entered by a customer 104 when searching for items to add to an order. Based on the query 540 entered in the search bar 530, the customer ordering interface 500A displays a set of items 510 matching the query 540 that are available at one or more warehouse locations. For example, items 510 matching the query 540 "toilet paper" may include item 510A and item 510B, which are different brands of toilet paper. Since many of the items 510 related to the query 540 are out of stock, the customer ordering interface 500 also displays a generic item 520 as an item that the customer 104 may add to an order. Though in FIG. 5A the generic item 520 is "toilet paper," like the query 540, in some embodiments, the generic item 520 and query 540 may be different. Further, the generic item 520 is associated with an interior price range 550 and a unit type 560.

Figure 5B:
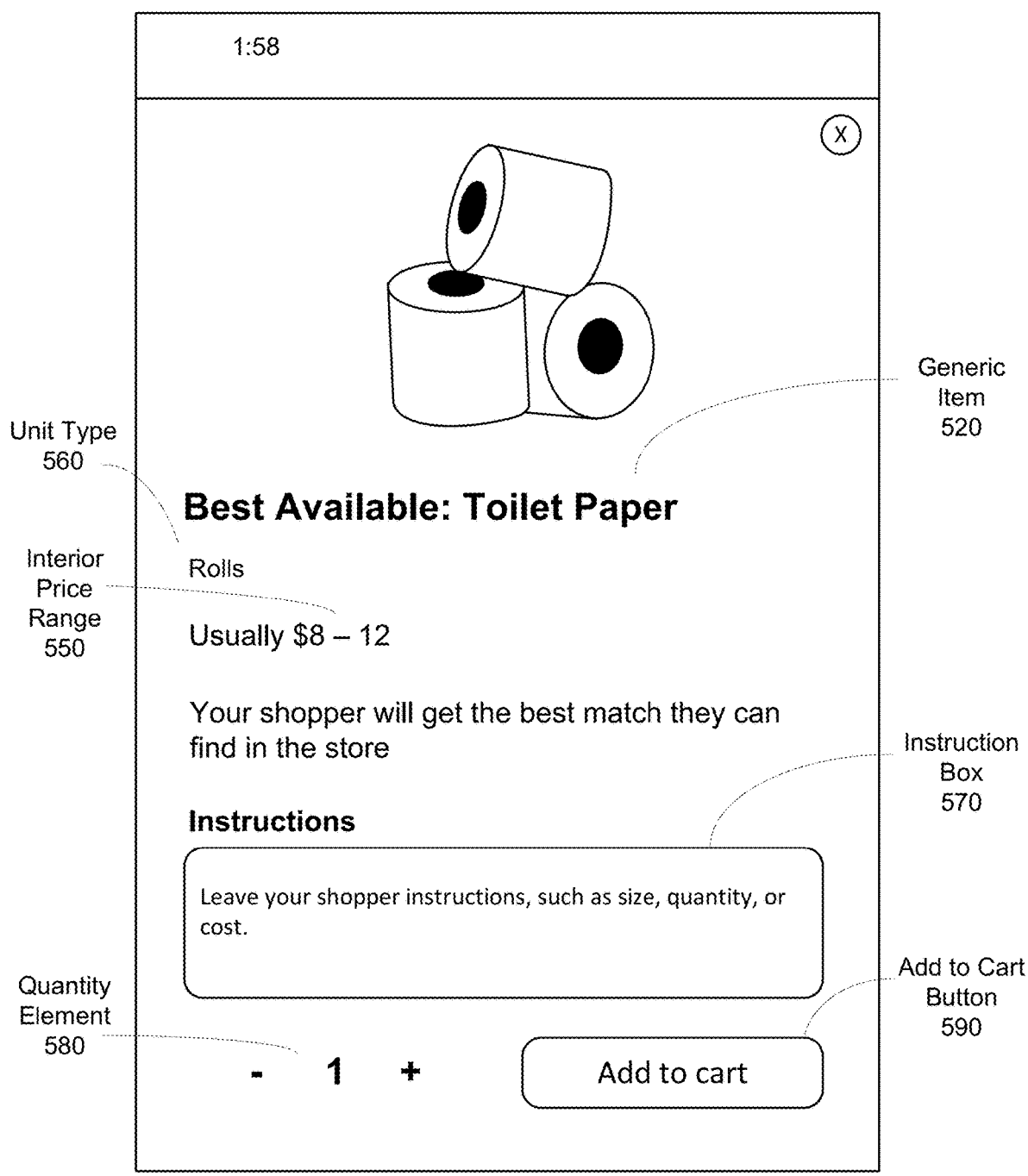
FIG. 5B is an example of a customer ordering interface illustrating a generic item, according to one embodiment.

FIG. 5B is an example of a customer ordering interface 500B illustrating a generic item 520, according to one embodiment. The customer ordering interface 500B includes a unit type 560 of the generic item 520 describing the units items in the product category of the generic item 520 are generally ordered in. For example, "toilet paper" is ordered in "rolls," while "chips" come in "bags." The customer ordering interface 500B also includes an interior price range 550, which describes a middle range of prices of items in the product category associated with the generic item 520, and an instruction box 570, which is an interactive element that a user may enter instructions for a picker in. The customer ordering interface 500B further includes interactive elements such as a quantity element 580 indicating an amount of the generic item 520 to add to the order and an add to cart button 590 for adding the generic item 520 to the order.

Figure 6:
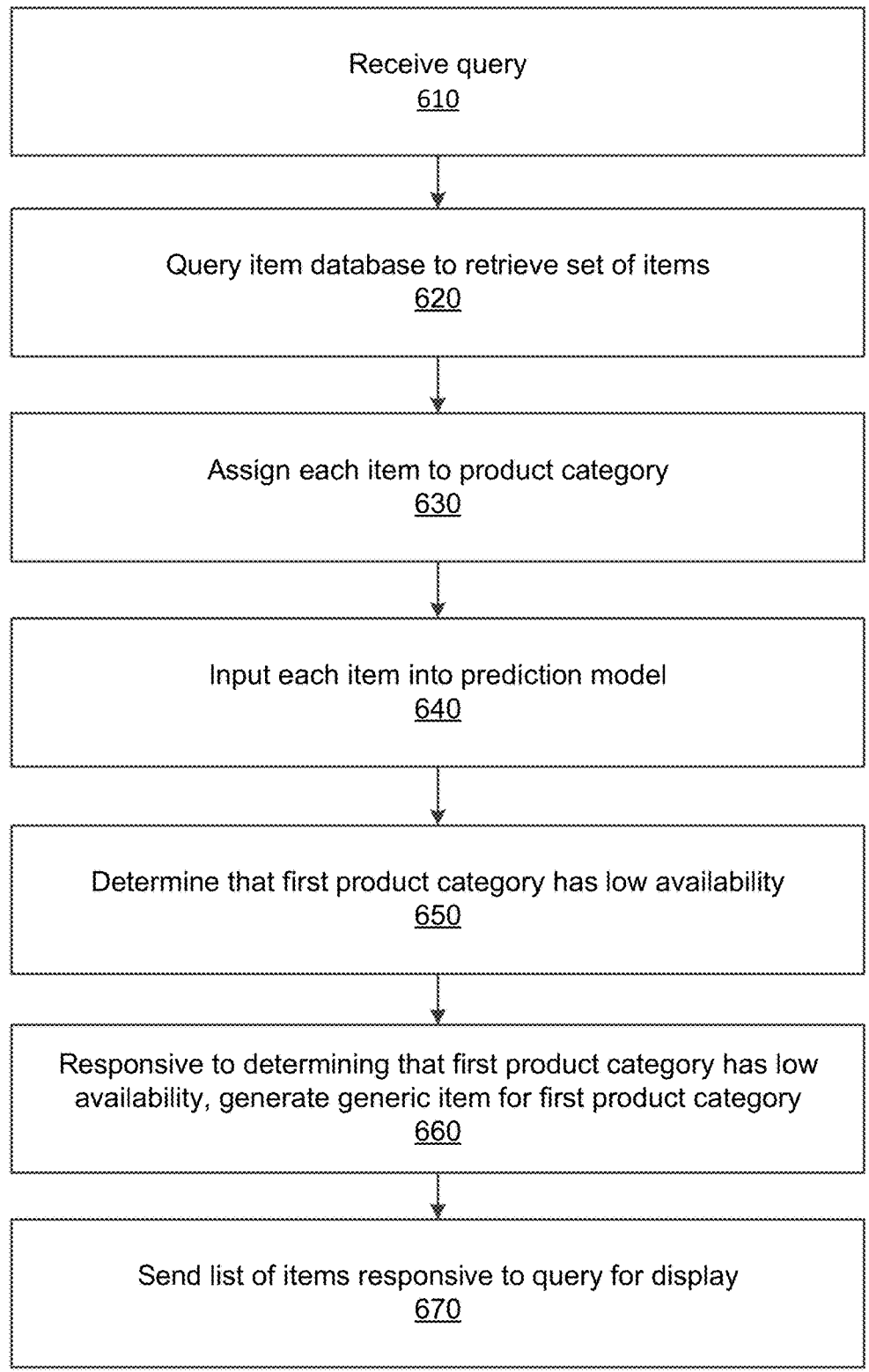
FIG. 6 is a flowchart illustrating a process for providing options for selection by a customer, according to one embodiment.

FIG. 6 is a flowchart illustrating a process 600 for providing options for selection by a customer 104, according to one embodiment. Though reference is made to the online concierge system 102 for this process 600, the process 600 can be used by other online systems or mobile applications for generating a generic item. The query module 400 receives 610 a query entered via a customer ordering interface 500 on a client device and queries 620 the item database 402 to retrieve a set of items matching the query. The category module 404 maps 630 each item in the set of items to a category in the taxonomy database 406, which stores a predefined taxonomy that maps items to product categories.

The availability module 408 inputs 640 each item in the set of items into the prediction model 410, which is a machine learning model trained to predict a probability that an item is available at one or more third-party warehouse locations. The prediction model 410 outputs a probability of availability for each item to the availability module 408. The availability module 408 determines 650 that a first product category has low availability based on a total predicted likelihood that each item assigned to the first product category is available at one or more third-party warehouse locations. The total predicted likelihood is a combination of the probability of availability for each item in the product category.

Responsive to determining that a first product category has low availability, the description module 414 generates 660 a generic item 520 for the first product category. The user interface module 416 sends a list of items 510 responsive to the query 540 to the client device for display via the customer ordering interface 500. The list of items 510 includes the generic item 520 as one of the items 510.

It is appreciated that although FIG. 8 illustrates a number of interactions according to one embodiment, the precise interactions and/or order of interactions may vary in different embodiments. For example, in some embodiments, the online concierge system 102 may charge a price of an item chosen by a picker for the generic item 520 to a user account associated with the client device of the customer 104. In other embodiments, the online concierge system 102 may charge a preliminary price from the price range or interior price range 550 to the user account for the generic item 520 and adjust the preliminary price once an order with an item chosen for the generic item 520 has been delivered to the customer 104.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising, at a computer system comprising a processor and memory:
    receiving a query sent from a user device to an online concierge system, wherein the query comprising a string of text entered by a user to the user device for searching the online concierge system;
    identifying a set of items matching the query, wherein each item of the set of items corresponds to a product category of a plurality of product categories;
    generating an availability prediction for each item of the set of items by applying a prediction model to each item of the set of items, wherein the availability prediction for each item of the set of items is a prediction of the likelihood that the item is available at a third-party warehouse location, and wherein the prediction model is a machine learning model trained to predict a probability that an item is available at a third-party warehouse location based on the third-party warehouse location and a plurality of characteristics associated with the item, wherein training the machine learning model comprises:
        obtaining a plurality of training examples, wherein each of the plurality of training examples comprises training data describing an availability of an item included in a previous order,
        for each training example of the plurality of training examples, updating the prediction model by:
            inputting the training data for the training example into the prediction model, wherein the prediction model generates a probability indicative of whether the item is available at a third-party warehouse location;
            computing a score for the training example based on the generated probability and the availability in the training data of the training example; and
            updating the prediction model based on the computed score, and
        repeating the updating until a confidence score associated with the probability that an item is available is above a threshold;
    determining that the product category has low availability based on the generated availability predictions for the set of items;
    responsive to determining that the product category has low availability, generating a generic item for the product category; and
    sending a list of items to the user device for display to the user, wherein the list of items includes the generic item as one of the items.

2. The method of claim 1, further comprising:
    storing a hierarchical taxonomy of product categories, wherein the hierarchical taxonomy maps items to product categories in the plurality of product categories.

3. The method of claim 2, wherein the product category for the set of items is a leaf category of the hierarchical taxonomy.

4. The method of claim 1, wherein determining that the product category has low availability comprises:
    computing a total predicted likelihood for the product category based on the generated availability predictions for the set of items; and
    comparing the total predicted likelihood to a threshold value.

5. The method of claim 1, further comprising:
    accessing a price for each item in the set of items;
    computing an interior price range for the product category based on the accessed prices for the set of items; and
    sending the interior price range to the user device to be displayed with the generic item.

6. The method of claim 5, wherein computing the interior price range comprises:
    computing a low end of the interior price range by computing a first percentile value of the accessed prices; and
    computing a high end of the interior price range by computing a second percentile value for the accessed prices.

7. The method of claim 5, wherein accessing a price for each item in the set of items comprises:
    determining a most common size of the set of items for the price category; and
    accessing a price associated with the most common size for each item in the set of items.

8. The method of claim 5, further comprising:
    receiving an indication from the user device that the generic item was added to an order placed by the user;
    determining a maximum price for the generic item based on the accessed prices for the set of items; and
    transmitting the maximum price to a user device associated with a picker for display to the picker along with the generic item.

9. The method of claim 8, wherein the maximum price is a high end of the interior price range.

10. A non-transitory computer-readable medium storing instructions that, when executed by a processor, cause the processor to:
    receive a query sent from a user device to an online concierge system, wherein the query comprising a string of text entered by a user to the user device for searching the online concierge system;
    identify a set of items matching the query, wherein each item of the set of items corresponds to a product category of a plurality of product categories;
    generate an availability prediction for each item of the set of items by applying a prediction model to each item of the set of items, wherein the availability prediction for each item of the set of items is a prediction of the likelihood that the item is available at a third-party warehouse location, and wherein the prediction model is a machine learning model trained to predict a probability that an item is available at a third-party warehouse location based on the third-party warehouse location and a plurality of characteristics associated with the item, wherein training the machine learning model comprises:

obtaining a plurality of training examples, wherein each of the plurality of training examples comprises training data describing an availability of an item included in a previous order, for each training example of the plurality of training examples, updating the prediction model by:
  inputting the training data for the training example into the prediction model, wherein the prediction model generates a probability indicative of whether the item is available at a third-party warehouse location;
  computing a score for the training example based on the generated probability and the availability in the training data of the training example; and
  updating the prediction model based on the computed score, and repeating the updating until a confidence score associated with the probability that an item is available is above a threshold;

determine that the product category has low availability based on the generated availability predictions for the set of items;

responsive to determining that the product category has low availability, generate a generic item for the product category; and send a list of items to the user device for display to the user, wherein the list of items includes the generic item as one of the items.

11. The computer-readable medium of claim 10, further storing instructions that cause the processor to: store a hierarchical taxonomy of product categories, wherein the hierarchical taxonomy maps items to product categories in the plurality of product categories.

12. The computer-readable medium of claim 11, wherein the product category for the set of items is a leaf category of the hierarchical taxonomy.

13. The computer-readable medium of claim 10, wherein the instructions for determining that the product category has low availability further cause the processor to:
compute a total predicted likelihood for the product category based on the generated availability predictions for the set of items; and
compare the total predicted likelihood to a threshold value.

14. The computer-readable medium of claim 10, further storing instructions that cause the processor to:
access a price for each item in the set of items;
compute an interior price range for the product category based on the accessed prices for the set of items; and
send the interior price range to the user device to be displayed with the generic item.

15. The computer-readable medium of claim 14, wherein the instructions for computing the interior price range further cause the processor to:
compute a low end of the interior price range by computing a first percentile value of the accessed prices; and
compute a high end of the interior price range by computing a second percentile value for the accessed prices.

16. The computer-readable medium of claim 14, wherein the instructions for accessing a price for each item in the set of items further cause the processor to:

determine a most common size of the set of items for the price category; and
access a price associated with the most common size for each item in the set of items.

17. The computer-readable medium of claim 14, further storing instructions that cause the processor to:
receive an indication from the user device that the generic item was added to an order placed by the user;
determine a maximum price for the generic item based on the accessed prices for the set of items; and
transmit the maximum price to a user device associated with a picker for display to the picker along with the generic item.

18. A system comprising:
a processor; and
a non-transitory computer-readable medium storing instructions that, when executed by the processor, cause the processor to:
  receive a query sent from a user device to an online concierge system, wherein the query comprising a string of text entered by a user to the user device for searching the online concierge system;
  identify a set of items matching the query, wherein each item of the set of items corresponds to a product category of a plurality of product categories;
generate an availability prediction for each item of the set of items by applying a prediction model to each item of the set of items, wherein the availability prediction for each item of the set of items is a prediction of the likelihood that the item is available at a third-party warehouse location, and wherein the prediction model is a machine learning model trained to predict a probability that an item is available at a third-party warehouse location based on the third-party warehouse location and a plurality of characteristics associated with the item, wherein training the machine learning model comprises:
  obtaining a plurality of training examples, wherein each of the plurality of training examples comprises training data describing an availability of an item included in a previous order,
  for each training example of the plurality of training examples, updating the prediction model by:
    inputting the training data for the training example into the prediction model, wherein the prediction model generates a probability indicative of whether the item is available at a third-party warehouse location;
    computing a score for the training example based on the generated probability and the availability in the training data of the training example; and
    updating the prediction model based on the computed score, and
  repeating the updating until a confidence score associated with the probability that an item is available is above a threshold;
determine that the product category has low availability based on the generated availability predictions for the set of items;
responsive to determining that the product category has low availability, generate a generic item for the product category; and
send a list of items to the user device for display to the user, wherein the list of items includes the generic item as one of the items.

* * * * *